No. 857,352. PATENTED JUNE 18, 1907.
H. E. KLINE.
CULTIVATOR.
APPLICATION FILED FEB. 8, 1907.
2 SHEETS—SHEET 1.
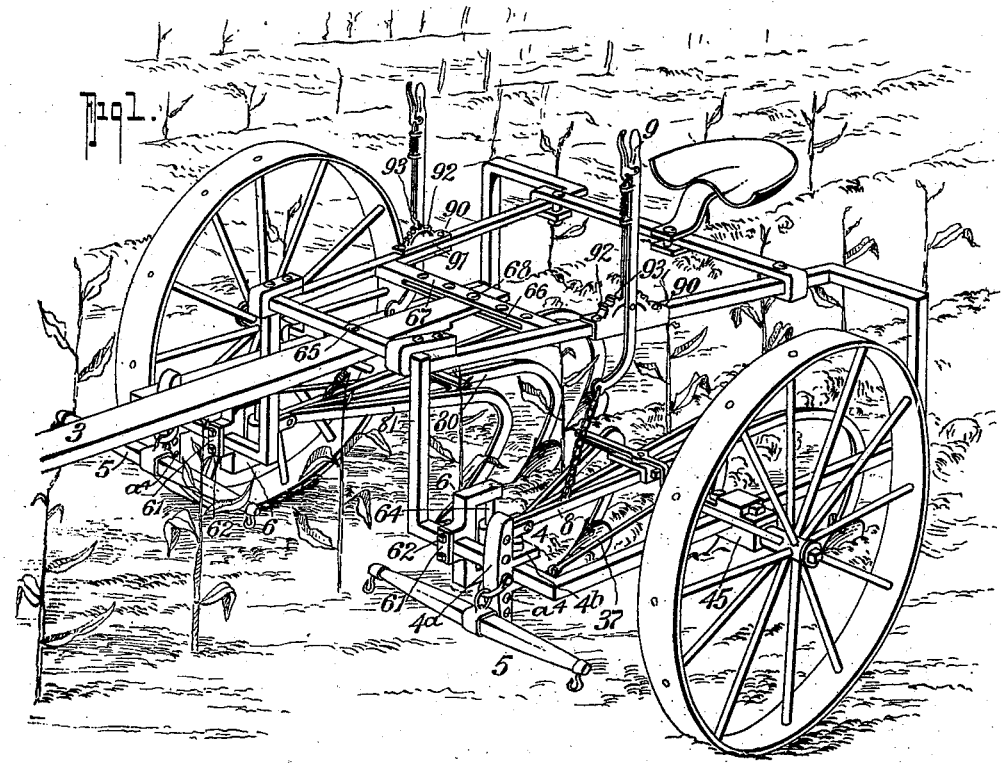
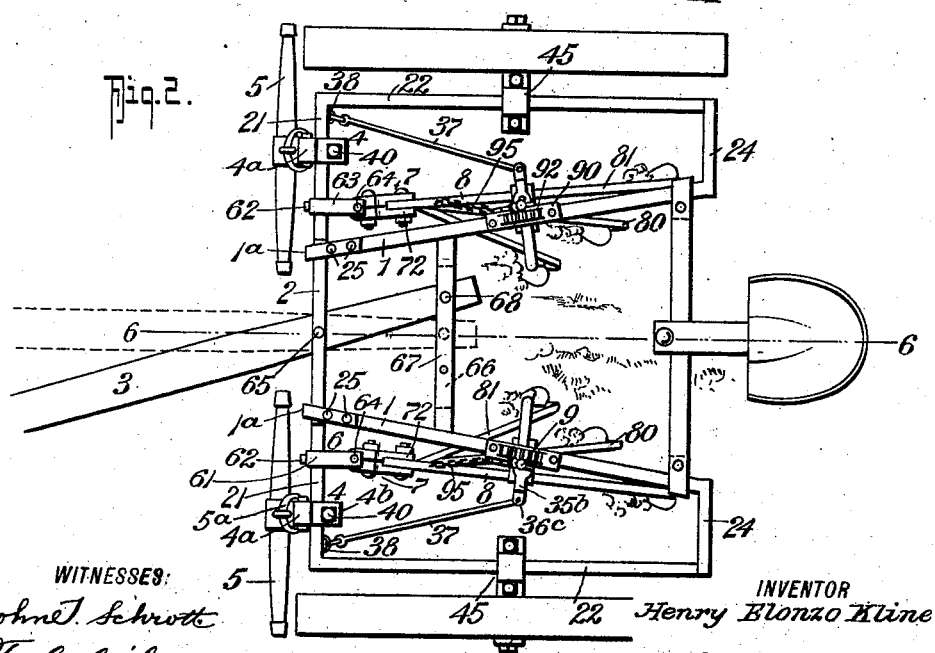
WITNESSES:
John T. Schrott
F. C. Gibson
INVENTOR
Henry Elonzo Kline.
BY
Fred G. Dieterich & Co.
ATTORNEYS

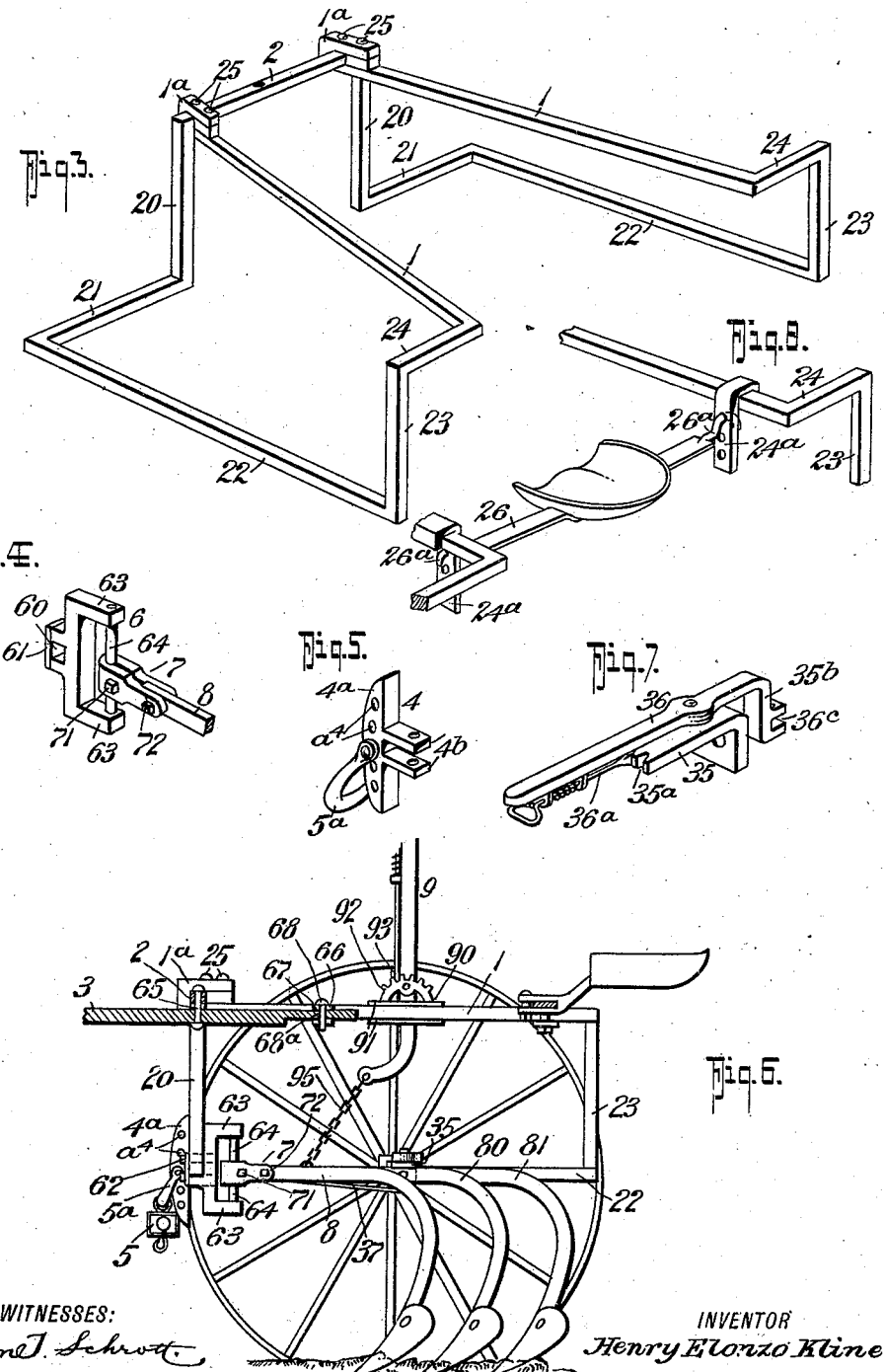

UNITED STATES PATENT OFFICE.

HENRY ELONZO KLINE, OF TERRE HAUTE, INDIANA, ASSIGNOR OF ONE-THIRD TO HENRY MEYER, OF TERRE HAUTE, INDIANA.

CULTIVATOR.

No. 857,352.  Specification of Letters Patent.  Patented June 18, 1907.

Application filed February 8, 1907. Serial No. 356,434.

*To all whom it may concern:*

Be it known that I, HENRY ELONZO KLINE, residing at Terre Haute, in the county of Vigo and State of Indiana, have invented a new and Improved Cultivator, of which the following is a specification.

This invention relates to improvements in that class of cultivators in which the frame is designed for coöperatively joining a plurality or gang of cultivator plows at each side of the draft tongue, and it comprehends generally, an improved construction of framing capable of being economically made up, and adapted for adjustably sustaining the oppositely disposed wheels whereby to balance the frame and for adjustably connecting the plow gangs thereto.

My invention in its more complete make up also embodies an improved construction of framing designed for adjustably sustaining the tongue so it can be laterally set with respect to frame to direct the line of draft to suit the pulling power of the team and in, such manner that the tongue may be readily removed when desired.

In its still more subordinate features my invention consists in certain details of construction and peculiar combination of parts, all of which will be hereinafter fully explained, specifically pointed out in the appended claims and illustrated in the accompanying drawings, in which:

Figure 1, is a perspective view of a cultivator constructed in accordance with my invention. Fig. 2, is a plan view indicating the draft tongue as adjusted slightly from the direct longitudinal line of draft, for reasons hereinafter explained. Fig. 3, is a perspective view showing the one piece main frame bent up to shape. Fig. 4, is a detail perspective view showing the means for connecting and adjustably mounting one set of cultivator plows. Fig. 5, is a detail perspective view, partly in section, of one of the swingle tree adjustable connections. Fig. 6, is a detail transverse section taken on the line 6—6 on Fig. 2. Fig. 7, is a perspective view of the lever 36 and the spring latch device that coöperates therewith. Fig. 8, illustrates a modified construction of means for supporting the driver's seat.

In the practical embodiment of my invention I provide a main frame which may be formed in sections suitably joined, but is preferably bent to shape from a single bar of iron square in cross section, to provide for conveniently mounting thereon the slide or adjusting boxes for the several connections hereinafter referred to.

The frame comprises substantially two opposing sections of like construction and each of which is mounted on a carrier wheel and has coöperatively joined thereto the gang of cultivator plows.

In its detailed formation the frame comprises a pair of upper bars 1—1, the ends of which are bent over upon themselves to form loops $1^a$—$1^a$ which extend over the cross bar 2 of the arched portion which includes the pendent side bars 20—20 that terminate at the lower in the oppositely projected and horizontal front bars 21—21 which in turn merge with rearwardly extended parallel side bars 22—22, the rear ends of which merge with the rear uprights 23—23 that end at the short inwardly bent members 24—24 which form a convenient means for attaching the seat bars and which in turn merge with the rear ends of the upper bars 1—1, which bars, as will be noticed from the drawings, extend divergingly rearward and have their forward ends fixedly held with respect to the cross or arch bar 2 by the bolts and nuts 25—25, as shown.

By forming the frame of a single bar as described and shown, it is apparent that the cost of manufacture of said frame is reduced to a minimum, and furthermore, by bending the frame members as stated, the upper bars 1—1 will be so positioned with respect to the remainder of the frame to provide for a desired setting of the adjusting levers that control the lift of the plow gangs, and also for the desired form of adjustable devices for holding the tongue 3 to its different lateral adjustments.

Since the manner of connecting the wheels, the swingle trees, the plow gangs and the means for adjusting the parts mentioned for each side of the cultivator is the same, a detailed description of the said parts for one side will suffice for both.

4 designates an angle iron, the web $4^a$ of which has a series of apertures $a^4$ to adjustably receive the clevis $5^a$ of the swingle tree 5, and the said iron, at a point about midway its height, has a forked extension $4^b$, adapted to fit over and slide on the front bar 21 on which it is firmly held to any of its set positions by the clamp bolt 40 that joins the forked ends of the extension 4ᵇ, as shown, such connection providing for the lateral and vertical adjustments of the swingle tree 5.

6 designates a head block which is also slidably mounted on the front bar 21 and extends rearwardly therefrom, it having a bifurcated front extension 60 that fits over the bar 21 to which it is firmly clamped to its set positions by the clamp plate 61 that straddles the bar 21 and has its ends secured to the bifurcated members 60 by the screw bolts 62. The head block 6 is vertically extended and has its inner edge provided with upper and lower extensions 63—63, in which is mounted a vertical stud or rod 64 upon which is held for vertical and lateral adjustment a split clip head 7 that takes around the rod 60 and is clamped thereto to any of its vertical adjustments by the clamp screws 71, as clearly shown in Fig. 4, by reference to which it will be also noticed that the clip head 7 extends rearwardly and is bifurcated to pivotally receive the forward end of the main plow beam 8, which is hung in the bifurcated end 72 of the clip to swing vertically out of or into an operative position, such swinging movement being effected by the lever 9 that joins with the plow beam by a flexible (chain) connection 95 and which is pivotally mounted on the box 90 having parallel flanges 91 for conveniently bolting onto the upper side bar 1 and provided with a segmental rack 92 to coact with the detent 93 on the lever 9, as shown.

80 and 81 designate the supplemental plow beams connected to the main beam 8 in any approved manner to project inwardly at an angle therefrom to provide the usual form of plow gangs, which gang is raised or lowered by the lever mechanisms 9, 90 and 95, before referred to. Mounted on the main beam 8 is a horizontal bracket 35 whose end terminates in a rack 35ᵃ and on this bracket is fulcrumed a horizontally disposed lever 36 having a detent 36ᵃ for engaging the rack 35ᵃ, and the said lever has a pendent portion 36ᵇ having forked heel 36ᶜ to receive the end of the link rod 37 that pivotally connects with an eye 38 on the front frame bar as shown. By providing the lever devices 36, the plow gang, when starting the cultivator, can be readily swung inwardly to the digging point desired by proper shifting of the lever 36, since the gang frame is swung around on the clip head and bolt connection at the front end.

45 designates an axle box slidably mounted on the outside frame bar, on which it is adjustably held by the nut and bolt members, as shown, whereby to provide for moving the axle box on the main frame to properly balance the machine.

The draft tongue, before referred to, is pivoted on a pin 65 that passes down through the cross or arch bar 2 to swing laterally in the horizontal plane and the rear end of the tongue extends through the elongated horizontal slot 66 in the cross bar 67 secured on the upper side members 1, and for sustaining the tongue to its laterally adjusted positions, a lock pin 68 is provided adapted for entering a set of a series of registering apertures on the cross bar 67, and a locking aperture 68 in the end of the tongue, as best shown in Fig. 6.

From the foregoing taken in connection with the accompanying drawings, the complete operation and the advantages of my invention, it is believed, will be readily understood.

It will be observed, the structure is of a simple and economical character, and the adjustments of the plows, the balancing of the frame, and the connecting of the tongue and the swingle trees, is easily provided for. By mounting the tongue in the manner shown and described, it can be readily set to the direct line of draft to suit the team; thus avoiding the necessity of double trees or draft eveners.

In Fig. 8 I have illustrated a modified construction of means for supporting the driver's seat, by reference to which it will be observed that upon the frame members 1 are pendently hung brackets 24ᵃ having a series of apertures with which the hook ends 26ᵃ of the said supporting cross bar 26 adjustably engage.

Having thus described my invention, what I claim and desire to secure by Letters Patent, is:

1. In a cultivator of the character described, a main frame formed of a single piece of bar iron, the ends of which are divergingly extended to form upper side bars, then pendently extended to form rear members, then forwardly extended in parallel planes, then bent inwardly at right angles toward each other to form lower front bars, then bent upwardly into a yoke shape, the cross bar of the yoke being fastened to two ends of the bar, substantially in the manner shown and described.

2. In a cultivator of the character described, the combination with the arched front frame and the laterally extended front members, the parallel side members, the rear vertical members and the upwardly diverging members having the front ends secured to the cross bar of the arch frame and a supplemental and horizontally slotted cross bar mounted on the diverging bars; of the tongue pivotally mounted on the cross bar of the arch, having its rear end extended through the slotted cross bar, means for receiving the said end in the slot, a supporting wheel, the swingle tree connections on the lower front frame members, and means for connecting the plow gangs to the lower front frame members and for shifting the gangs laterally and vertically with respect to the frame, all being arranged substantially as shown and described.

3. In a cultivator of the character described, the combination with one of the upper and lower side sections comprising a longitudinally extended side bar, a rear vertical member, a front horizontal and vertical member, and a diagonally disposed upper member connected at the ends with the vertical members of the frame; of the supporting wheel adjustably mounted on the side bar, the swingle tree adjustably mounted in the front member, the plow gear connection box adjustably mounted on the front frame member, said connection including a laterally swinging and vertically shiftable clip head, the plow gang pivotally connected to said clip head and means for shifting the plow gang vertically and laterally with respect to the frame, as set forth.

HENRY ELONZO KLINE.

Witnesses:
  JAMES L. ALLEN,
  D. H. TURNER.